March 23, 1965   J. J. GASSER   3,175,190
MACHINE TOOL CONTROL CIRCUIT HAVING A PROGRAM CROSSBAR
SWITCH AND A BRIDGE MEANS FOR CHECKING CROSSPOINTS
Filed Feb. 15, 1961   2 Sheets-Sheet 1

INVENTOR.
J. J. GASSER
BY
ATTORNEY

United States Patent Office 3,175,190
Patented Mar. 23, 1965

3,175,190
MACHINE TOOL CONTROL CIRCUIT HAVING A PROGRAM CROSSBAR SWITCH AND A BRIDGE MEANS FOR CHECKING CROSSPOINTS
John J. Gasser, Chicago, Ill., assignor to International Telephone and Telegraph Corporation, New York, N.Y., a corporation of Maryland
Filed Feb. 15, 1961, Ser. No. 89,408
2 Claims. (Cl. 340—147)

This invention relates to automatically controlled machine tools and more particularly to control circuits for preventing improper operation of such machine tools.

Most power driven machine tools may be adapted to operate automatically responsive to numerical control data prerecorded on storage media such as perforated or magnetic tape, punched cards, or the like. These numerically controlled machines require fail-safe, interlocking control circuits to prevent goods that are in the process of being machined from being damaged or destroyed during such machining operation. This is very important because these machines may produce either very expensive goods or a very high quantity of less expensive goods during a relatively short period of time. For example, a piece part may have thousands of dollars of machining performed upon it before it is completed by the machine tool, or a great number of less expensive parts may be produced by the machine before an improper machine operation is detected. In either event, a malfunction of the machine may ruin parts worth large sums of money. Obviously, control circuits which supervise the operation of these machines must act quickly to prevent incorrect operations before they occur.

In general, a programmed work cycle of a numerically controlled machine tool is read-out of the storage media and transmitted to a register or other storage device. Signals from the register are then used to control actuators which drive or otherwise control the machine in accordance with the original instructions recorded on the storage media. One type of register, which is commonly used for this purpose, incorporates one or more crossbar switches of the type generally used in automatic telephony. A study of circuits incorporating these crossbar switches has indicated that failures which are most likely to occur involve the simultaneous closing of more or less than one set of switching points in response to a single bit of stored data. Therefore, if such improper operation of more or less than one set of switching points can be detected before the machine tool is allowed to operate in response thereto, the vast majority of tool failures that occur in the crossbar registers or storage devices can be prevented.

Accordingly, an object of this invention is to provide new and improved control circuits for automatic machine tools. More specifically, an object is to prelude switches which control machine tools from causing a defective machine tool operation if a faulty or non-standard switch operation is detected. Still further, an object of this invention is to provide for such a function without requiring expensive and extensive modification of switches already in use on machine tools.

Another object of this invention is to provide means for testing the operation of a crossbar switch. More specifically, an object is to provide an interlocking control circuit for positively checking each crossbar switch operation and for precluding the operation of equipment controlled by such switch if data is improperly registered therein. In this connection, an object of the invention is to detect a simultaneous operation of more or less than one switching point in crossbar switches.

In accordance with one aspect of this invention, an automatic machine tool is designed to operate responsive to programmed numerical data stored on perforated, magnetic, or other storage media. The storage media is advanced and the stored data is non-destructively read-out in blocks of information, each block including a number of bits of information. Responsive to each read-out, a selected switching point in a crossbar switch is operated to register each bit of information and, further, to translate each bit into a machine tool command signal. Since telephone type crossbar switches are used, the translation is accomplished through conventional tip and ring switching points, and the previously unused sleeve switching points are used for control purposes. More specifically, a fixed impedance associated with each set of switching points is inserted as a branch of a bridge circuit when the switching point closes. If more or less than one switching point operates at any given time, the bridge is unbalanced and the unbalanced bridge current is used to operate or hold a relay. Operation or continued operation of the relay precludes further response in the machine tool control system and gives an alarm.

The above mentioned and other features and objects of this invention and the manner of obtaining them will become more apparent and the invention itself will be best understood by reference to the following description of an embodiment of the invention taken in conjunction with the accompanying drawings wherein.

Figure 1:
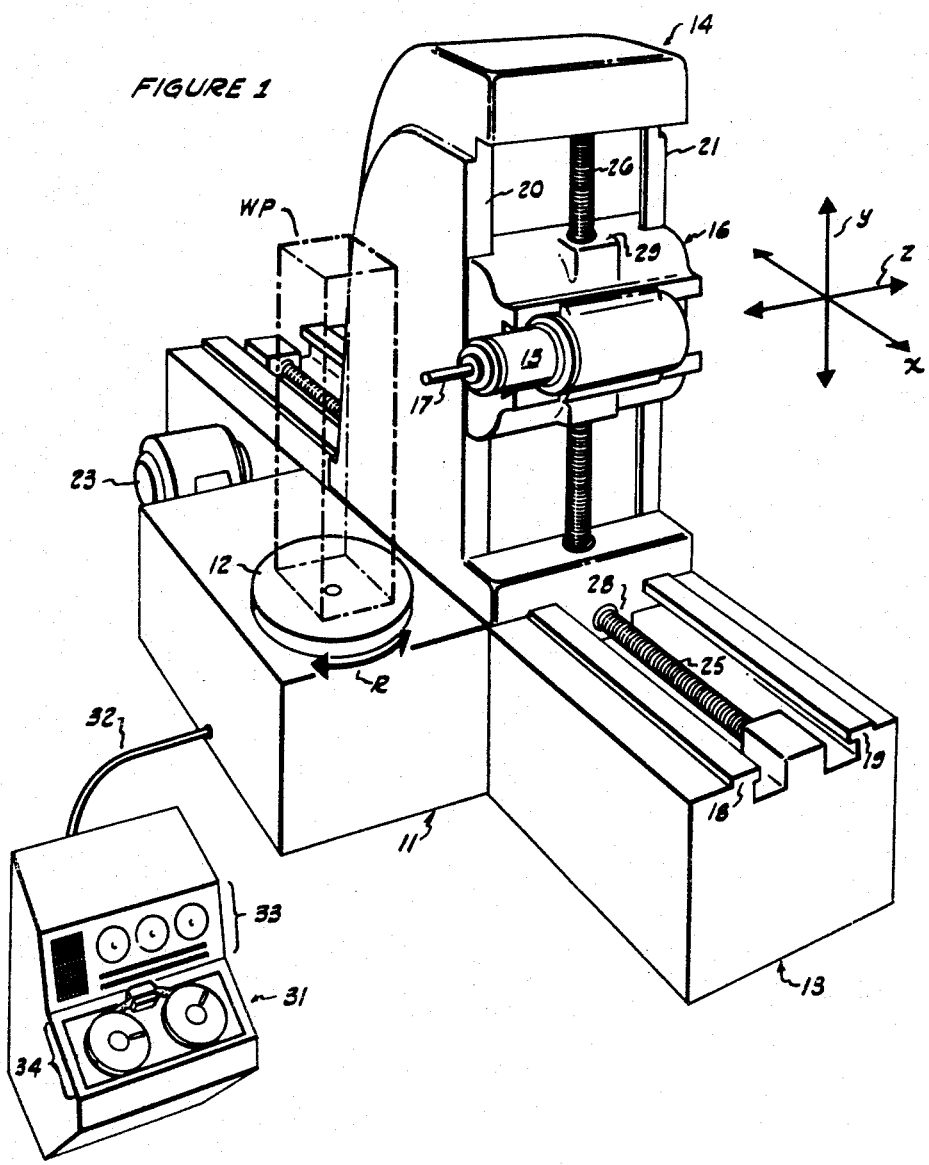
FIG. 1 is a perspective view of an automatic machine tool of the type that is controlled by programmed numerical data stored in crossbar switches.

FIG. 1 shows the principles of an exemplary automatic machine tool utilizing control circuitry of the type described herein. To facilitate an understanding of the invention, only those portions of the machine which are required for an understanding of the invention are shown. The principal parts of the machine are a table support 11, a table 12, a bed 13, a vertical column 14, a spindle 15, and a saddle 16 for supporting the spindle and its working tool 17 (here shown as a drill). The work piece WP shown by dot-dashed lines, is secured to the table in any convenient manner. Thus, the machine tool, as here shown, is adapted to drill a hole in a work piece at any location. This location is defined in terms of distances along the x, y, and z coordinates and in terms of a fourth motion wherein the table is rotated as indicated by the arrow B.

To provide a first of these motions in the x direction, the bed 13 is provided with two longitudinally extending guideways 18, 19 on which the vertical column 14 is moved. The column 14, in turn, includes a pair of vertically extending guideways 20, 21 which allow the saddle 16 to move in the second or y direction. The saddle 16 also includes a pair of longitudinally extending guideways on which the spindle 15 moves in a third or z direction. The table is free to rotate on the table support in either a clockwise or a counterclockwise or fourth motion during the setup time.

The motive power for driving the automatic machine tool parts is provided by a motor 23 connected through a suitable gear train (not shown) to a number of lead screws 25, 26 or similar devices. It should be understood that the motor 23 and the lead screws 25, 26 are generic showings intended to cover mechanical, electrical, and hydraulically controlled devices. Thus, when the first lead screw 25 is driven in either of two directions, a nut 28 rigidly secured to the bottom of the vertical column is driven back and forth in the x direction thereby moving the column to a prescribed location. Thereafter, a clutch associated with the gear train is operated and the motive power is transferred from the first lead screw 25 to the second lead screw 26 which rotates in either direction to move a nut 29 attached to the saddle 16 up or down, again to provide the tool motion in the y direction. Finally, another clutch associated with the gear train is operated to drive a third lead screw (not shown) associated with the spindle thus advancing or retracting it in the z direction. After the working tool 17 is properly positioned relative to the work piece WP, the clutches and gear train operate to select the correct feed and speed rates. The term "feed rate" means the rate at which the spindle is advanced while a hole is drilled by tool 17 and the term "speed rate" indicates the rate at which the drill 17 rotates.

Upon reflection, it will be seen that the exact location of the tip of the drill relative to the work piece is determined first by the position to which the table is rotated during setup and thereafter by the manner in which the gear train is clutched to drive the lead screws. The gear train and clutches are, in turn, controlled by electrical signals transmitted from an associated console 31 over a cable 32 to the machine tool. While the console 31 and associated equipment may take many different forms, it is here shown as including two sources of numerical data; a number of controls 33, and a perforated tape reader 34. The controls 33 may conveniently be in the form of dials or pushbuttons which are operated to provide information such as the length of initial movements required in the x, y, and z directions, the feed and speed rates, and the like. Alternatively, this information may be recorded on the perforated paper tape 34.

An advantage of using programmed numerical control data is that a complete work cycle of the machine may be prerecorded so that after the machine is set up, it automatically completes its prescribed work cycle without requiring any further human supervision. However, it is still necessary to provide the machine tool command signals which actually drive the machine itself. Therefore, it is necessary to translate the stored numerical data into command signals which operate the machine. For this purpose, it is convenient to use a numerically controlled device such as a telephone crossbar switch.

Figure 2:
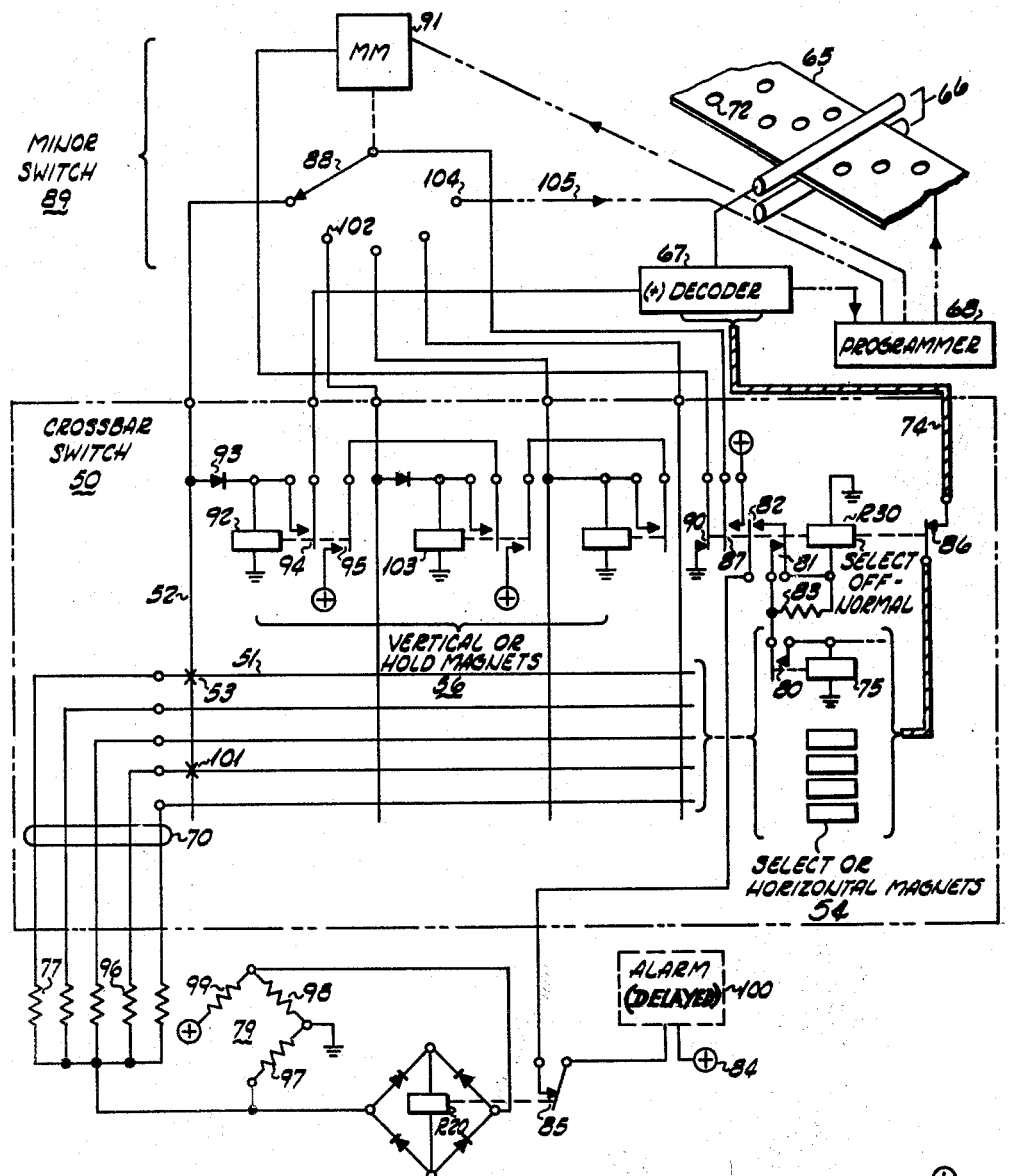
FIG. 2 is a circuit diagram showing a crossbar switch and a control circuit for checking the operation of the switch after each bit of information is stored therein.

While those skilled in the art of automatic telephone switching techniques are familiar with such crossbar switches, it may be helpful to review briefly the manner in which they are constructed and operated. As shown at 50 in FIG. 2, the crossbar switch is enclosed within a dot-dashed rectangle. The basic elements of the crossbar switch are a plurality of first or horizontal multiples (such as multiple 51) which intersect with a plurality of second or vertical multiples (such as multiple 52) to provide a switching point (such as switching point 53). While these switching points may take different forms, it is conventional for them to include switching points for interconnecting at least one pair of message carrying conductors and a single control conductor. Some crossbar switches include twice this number of switching points. To select the switching point which operates, a particular select or horizontal magnet in group 54 is operated to prepare all contacts in an associated horizontal multiple. Thereafter, a selected hold or vertical magnet in group 56 is operated and a switching point closes at the intersection of the prepared horizontal and the selected vertical multiples. Then, the select or horizontal magnet releases, thus leaving the closed switching point under the control of the operated hold magnet. Thereafter, another select and hold magnet may be operated to close a switching point in another vertical multiple. From the foregoing, it is apparent that the numerical data stored on the tape may cause selection and operation of any number of switching points and that command signals actually fed into the machine tool may be provided by strappings on the closed switching point.

Figure 3:
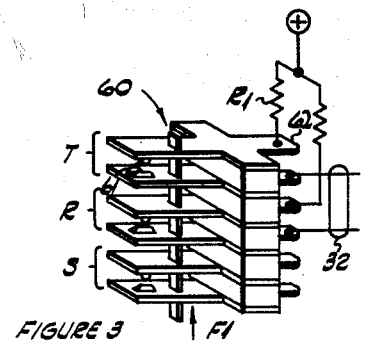
FIG. 3 is a perspective view of a single switching point in the crossbar switch showing tip, ring, and sleeve switching contacts.

Specifically, as shown in FIG. 3, each switching point includes a stackup of springs 60 with precious metal contacts 61 formed on one end thereof and integral lugs 62 formed on the other end thereof. When a force, here symbolicly depicted by the arrow F1, is applied, the springs move mechanically so that the contact material of one spring engages the contact material of another spring thereby closing an electrical circuit. As shown herein, the machine command signal results from a selection of a resistor R1 connected to the lug of a closed switching point. The magnitude of a potential, and hence the magnitude of a command signal, applied to the machine tool via the switching point is determined by the value of risistance at R1. Quite obviously, the magnitude of this resistance is, in turn, determined by the values of resistors previously wired to the lugs of the switching points. With conventional crossbar switches used as registers for converting the coded data into these command signals, the command signals are transmitted to the machine tool through tip and ring contacts T and R thus leaving the sleeve contacts S free for supervisory purposes. Quite obviously, the command potential changes radically if more than one switching point is closed. Also obviously, there is no command potential if no switching point closes.

As previously explained, the major problem in crossbar storage is not one of determining that the correct switching point has operated, but is one of determining that only one switching point has operated. More specifically, as here shown, a checking circuit for determining the number of switching points that operates includes the perforated paper tape 65, a reading head 66, a decoder matrix 67 for converting signals emanating from the reading head into crossbar switch control signals, a programmer 68 for driving the perforated tape and associated machine tool, the crossbar switch 50, and sleeve conductors 70 associated with the switch. It should be understood that although the switch 50 shows only the sleeve conductors, the tip and conductors are also provided.

The perforated tape 65 is here shown as including a number of coded perforations, one of which is shown at 72. These perforations are arranged in blocks of information separated by start and stop signals. Each block includes a number of bits of information. The tape is guided under the reading head 66 which may include a number of feeler contacts that drop through each perforation passing thereunder to establish an electrical contact with an electrode positioned immediately beneath the reading head. Alternative embodiments may include a lamp-photoelectric cell combination, a magnetic tape recorder, or the like. As each feeler contact drops through a perforation in the tape, a signal is sent to the decoder which selects one of a number of conductors in cable 74 extending to the crossbar switch for registering and translating the numerical data. In greater detail, each of the conductors extends to an individually associated select or horizontal magnet such as the magnet 75 which operates when a signal is received over cable 74. After a complete block of information is read-off the perforated tape, the stop signal is sent to the programmer which stops the advance of the tape until suitable signals are returned to the programmer from the automatic machine tool indicating that the demanded function has been completed. Thereafter, another block of information is read-out and stored in the crossbar switch.

Means including a balanced bridge circuit are provided for checking each operation of the crossbar switch to determine whether more or less than one switching point has operated. That is, a fixed impedance (such as a resistor 77) is connected to each of the horizontal sleeve mutliples. When each associated switching point closes, a circuit is completed through one of these impedances to a balanced bridge network 79. The values of the impedances in the balanced bridge network are selected so that when one and only one switching point closes, the bridge is in balance and a relay R20 is released. On the other hand, if more than one switching point operates, a plurality of horizontal multiple impedances are connected in parallel thus unbalancing the bridge and causing the relay R20 to operate. It will also be apparent that the bridge is unbalanced and the relay R20 is operated if none of the switching points is closed because then no impedance is connected into the bridge circuit.

In greater detail, responsive to the operation of the select or horizontal magnet 75, for example, the first horizontal multiple 51 is prepared for operation, contacts 80 close, and a select off-normal relay R30 operates. Responsive jointly to the operation of relay R30 and magnet 75, locking contacts 82 operate to complete a holding circuit traced from ground through the winding of magnet 75, the locking contacts 80, a resistor 83, and in parallel therewith from ground through the winding of the select off-normal relay R30 to positive battery 84 extended through an alarm device and the contacts 85 on the control relay R20. The resistor 83 drops the current flow through the winding of the select magnet since it requires a much lower current to hold the magnet than it does to operate it. Moreover, the higher initial current ensures a faster select magnet operation. Also responsive to the operation of the select off-normal relay R30, contacts 86 extending to the select magnets are opened to prevent operation of another horizontal or select magnet at this time. When the contacts 87 are closed, a positive battery marking is extended to a wiper 88 of a distributor, here shown as a minor switch 89. Finally, relay R30 opens its contacts 90 to break a circuit between the programmer 68 and a motor magnet 91 of the distributor.

To distribute the bits of information read-off the perforated tape to successive vertical multiples of the crossbar switch, the distributor is driven step by step over its associated bank. For example, the distributor may take a first step and a feed rate is stored on a first vertical multiple of the switch. When the distributor takes its second step, a speed rate is stored on the second vertical multiple. On the next three steps of the distributor, the x, y, and z positions are stored on the third through fifth vertical multiples, respectively. As here shown, the wiper 88 has been driven into electrical contact with the first step of its associated bank. On this step, a circuit is completed for operating the swiching point 53 in the example assumed. That is, the operating circuit extends from ground through the winding of hold magnet 92, diode 93, wiper 88, and contacts 87 to positive battery. Contacts 94 close and magnet 92 locks to the decoder 67. This locking circuit will not be broken until the machine tool has performed its function and the next block of information is read-off the perforated tape. Contacts 95 close and a locking circuit is prepared for the next hold magnet. Similar locking circuits will also be prepared by each hold magnet as it operates. The next circuit operation depends upon the number of switching points that have closed in the crossbar switch.

The bridge is unbalanced if more or less than one of the switching points operates simultaneously. More particularly, assuming that the crossbar switch incorrectly closes an extra switching point when the hold magnet operates (such as switching point 101, for example), a circuit is completed for placing the resistors 77, 96 in parallel, the bridge 79 is unbalanced, and current continues to flow in the winding of relay R20. The bridge circuit may be traced from positive battery through contacts 87, wiper 88, switching points 53, 101, resistors 77, 96 (in parallel), and resistor 97 to ground. The other side of the bridge includes the resistors 98, 99 connected between battery and ground. If no crosspoint has closed, the bridge is also unbalanced and the relay R20 remains operated. Since relay R20 does not release, contacts 85 remain closed and relay R30, magnet 75 remain operated to preclude further operation of both the crossbar switch and the machine tool. Contacts 86 do not reclose and nothing further is stored in the crossbar switch. A predetermined time after the contacts 82 close, alarm 100 operates and gives a signal.

If it is next assumed that the circuit functions correctly and only the switching point 53 is operated, the bridge 79 is balanced because only the resistor 77 is connected into the bridge circuit. Since the bridge is in balance, current no longer flows through the winding of relay R20 which releases. Contacts 85 open and the hold circuit for select magnet 75 and off-normal relay R30 is broken. Each releases and the next bit of data is stored in the crossbar switch when the contacts 86 close. The alarm 100 has not had time to operate since the contacts 82 closed.

After select off-normal relay R30 releases, and before it reoperates when the next bit of data is stored in the crossbar switch, a circuit is completed through contacts 90 for operating the motor magnet 91 and driving the wiper 88 to the terminal 102. Thus, the hold magnet 103 is operated to store the second bit of data read-off the perforated tape. Thereafter, the bridge 79 is again connected to the crossbar switch to check its operation. After all data is stored in the crossbar switch, the wiper 88 reaches its last position at the terminal 104, the programmer 68 is operated as indicated by the dot-dashed line 105, and a command signal is transmitted from the programmer to the machine tool to command its function in accordance with data stored in the crossbar switch. After this function is completed, the automatic machine tool signals the programmer which, in turn, commands the read-out of the next block of information and the storage cycle is repeated.

Thus, it is seen that the invention provides an interlocking circuit which automatically checks itself after each bit of information is registered. The machine tool is not allowed to complete its function until all information is correctly stored in the register. Moreover, all of this is provided through the standard sleeve conductors normally provided on telephone type crossbar switches. Therefore, no expensive modification is required to existing crossbar controlled circuits.

It is to be understood that the foregoing description of a specific embodiment of the invention is not to be construed as a limitation upon its scope.

I claim:
1. An electrical circuit for controlling automatic machine tools comprising:
  means for applying a working tool to a work piece in response to programmed numerical data;
  means for storing said programmed numerical data;
  means including a crossbar switch having a number of switching points for translating said stored data into machine tool operational command signals;
  means for checking said crossbar switch after each operation thereof to determine whether or not it operated correctly in response to said numerical data;
  means selectively responsive to either the failure of a switching point to close or the simultaneous closure of two or more switching points in the crossbar switch for precluding further operation of said control circuit;
  said crossbar switch comprising first and second intersecting multiples which provide the switching points;
  a fixed impedance connected to each of said first multiples;
  a balanced bridge circuit;
  means for connecting one of said fixed impedances as a branch of said balanced bridge responsive to each operation of a corresponding one of said switching points whereby the balance of said bridge changes if more or less than one of said switching points operates at any given time; and means responsive to unbalance of said bridge after operation of said crossbar switch for precluding operation of said machine tool.

2. A control circuit for an automatic machine tool comprising: a source of stored numerical data;

switch means having a plurality of switching points divided into multiples;

decoder means for translating said stored data into signals for controlling said switch means;

means for distributing said control signals to successive multiples of said switch means;

means responsive to each operation of said distributing means for storing a bit of said numerical data on a corresponding one of said multiples;

means responsive to each storage of one of said bits for checking said switch means to determine whether one and only one of said switching points has operated;

means responsive to said checking means for driving said distributing means to store the next of said bits in said switch means if one and only one of said switching points has operated;

means also responsive to said checking means for precluding further storage of said data in said switch means if more or less than one of said switching points has operated;

means responsive to said distributing means reaching a predetermined position for causing said machine tool to function in accordance with the data stored in said switch means;

a fixed impedance connected to some of said multiples;

a balanced bridge arrangement;

means for connecting one of said fixed impedances as a branch of said balanced bridge responsive to each operation of a corresponding one of said switching points, whereby the bridge is in balance if one and only one of said switching points operates at any given time; and means whereby said means for precluding further storage of said data is operated responsive to an unbalancing of said bridge.

References Cited by the Examiner
UNITED STATES PATENTS

| | | | |
|---|---|---|---|
| 1,730,977 | 10/29 | Johnson | 179—175.21 |
| 2,354,534 | 7/44 | Mason | 340—147 |
| 2,682,573 | 6/54 | Hunt | 340—146.1 XR |
| 2,751,578 | 6/56 | Johannesson | 340—253 |
| 2,782,404 | 2/57 | Bergman | 340—253 |
| 2,871,289 | 1/59 | Cox et al. | 340—147 |
| 2,898,483 | 8/59 | Muller | 307—115 |
| 2,950,462 | 8/60 | Dzaack | 340—147 |
| 2,971,055 | 2/61 | Grottrup et al. | 340—147 |
| 2,975,404 | 3/61 | Kups | 340—146.1 XR |
| 2,994,062 | 7/61 | Chiapuzio et al. | 340—285 |

NEIL C. READ, *Primary Examiner*.